United States Patent [19]

Nandlal

[11] Patent Number: 4,521,131
[45] Date of Patent: Jun. 4, 1985

[54] LIGHTWEIGHT SEMI-FLEXIBLE DIKE

[75] Inventor: Samlal Nandlal, Slidell, La.

[73] Assignee: Shell Offshore Inc., Houston, Tex.

[21] Appl. No.: 610,228

[22] Filed: May 14, 1984

[51] Int. Cl.³ .............................................. E02B 3/10
[52] U.S. Cl. ...................................... 405/116; 405/15
[58] Field of Search .................. 405/15, 16, 21, 32,
405/107, 115, 116, 117

[56] References Cited

U.S. PATENT DOCUMENTS

| 1,879,430 | 9/1932 | Noetzli | 405/116 |
| 3,680,319 | 8/1972 | Draper et al. | 405/116 |
| 4,184,786 | 1/1980 | Richards | 405/117 X |

FOREIGN PATENT DOCUMENTS 968726   6/1975   Canada .................................. 405/32

Primary Examiner—David H. Corbin

[57] ABSTRACT

The present invention is directed to a method of installing an erosion-preventing lightweight, semi-permeable, semi-flexible structure in the form of a dike for erosion control of a bank along a body of water. The method comprises the excavation of hydraulically placed silty or clay-containing sand fill or existing silty or clay-containing beach sands to form a trench and the placing of a synthetic woven fabric at the base of the excavation. A mixture of shell, sand and cement is then formed and placed in the excavated trench and compacted therein in layers to construct a dike. After covering the dike with a porous synthetic fabric, rock-filled gabions are then placed on the water-side face and crest of the dike.

14 Claims, 6 Drawing Figures

LIGHTWEIGHT SEMI-FLEXIBLE DIKE

BACKGROUND OF THE INVENTION

Erosion control of hydraulically-placed silty or clay-containing sands forming the bank of a body of water is a continuing problem and has met with little success on a long term basis. For example, most of the water barriers employed in the Mississippi River delta have to be continually repaired and strengthened. It is common to form dikes or water barriers of rock riprap either alone or mixed with shells, such as oyster shells. Due to the character of the land on which the dike is formed, there is generally uneven settling of the riprap material into the unstable bottom.

If a solid cement dike is employed, uneven settling of the land underneath the dike due to the weight of the dike causes cracks in the dike which are further eroded by wave action perpendicular to the dike or the current of a river moving along the face of the dike. Dikes made of rock riprap and shell or other materials are also subjected to the erosion caused by the flowing river or waves caused by passing ships or barges. Most types of dikes presently used in river delta environment are constantly in need of repair.

SUMMARY OF THE INVENTION

The present invention is directed to a method of constructing or installing an erosion-preventing, lightweight, semi-permeable core, semi-flexible structure in the form of a dike or breakwater for erosion control of a river bank or a bank along a body of water. In carrying out the method of the present invention, a trench is excavated in the land forming a bank along a body of water. The bottom of the trench and at least the trench wall toward the water is covered with a woven synthetic permeable, flexible fabric to form a trench cover so as to separate dike building material from the trench subsoil and to inhibit the migration of fines into the underlying soils. A quantity of dike material is mixed together from a mixture of shells, sand and cement. The intent of this mixture is to also minimize the seepage of water through the dike core resulting in minimal pore pressure build-up in the underlying sands. The mixed material is then spread in a series of shallow layers in the trench where it is compacted between layers. After the dike has been built to the designed height, the crest of the dike and at least the water side slope of the dike are covered with a second synthetic flexible fabric to form a dike cover that is permeable to water but impermeable to substantially all of the fine solid material in the shell-sand-cement mixture. Subsequently, the dike covering is anchored on the top of the dike and at least the water side slope of the dike by positioning the layer of rock filled gabions over the fabric.

It is an object of the present invention to provide a method of constructing a lightweight semi-flexible dike structure that is compliant to the degree that a portion of the structure may sag into the subsoil without any large cracks forming which could be further eroded by a current of river water or by waves. Additionally, it is an object of this invention to provide a covered dike which is constructed in a manner such that particles of material within the dike do not escape into the adjacent body of water through the synthetic dike covering.

BRIEF DESCRIPTION OF THE DRAWING

FIG. 1 is a diagrammatic cross section after the trenching operation has been carried out.

FIG. 2 schematically illustrates a trench after a layer of fabric has been put on the bottom of the trench and the side wall toward the body of water.

FIG. 3 is a diagrammatic cross-sectional view showing the trench held to mean sea level with the dike construction material.

FIG. 4 diagrammatically shows a cross section of the dike after it has been built up to its design level.

FIG. 5 diagrammatically illustrates the dike of the present invention after it has been covered by a layer of rock-filled gabions.

DESCRIPTION OF A PREFERRED EMBODIMENT

Figure 1:
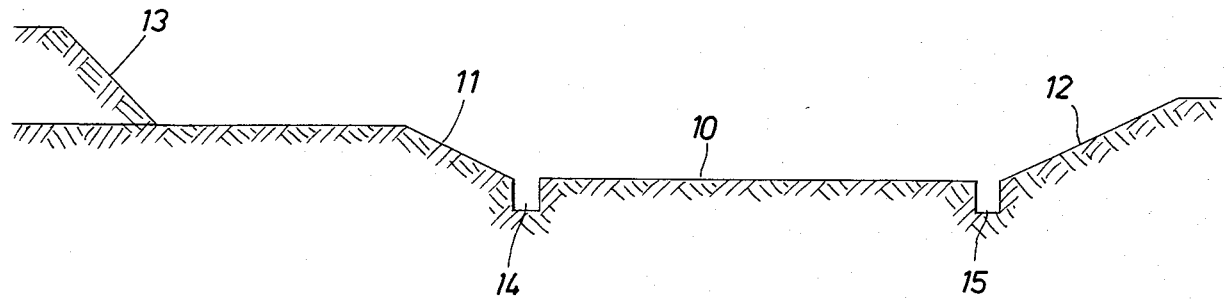
FIGS. 1 through 5 are cross-sectional views diagrammatically illustrating a typical series of steps in carrying out the construction of the dike of the present invention.

For purposes of illustration, the present invention will be described with regard to building the dike of the present invention along a bank of the Mississippi River in the delta area where the land is made up of hydraulically-placed silty sand fill or where there may be existing silty beach sands in designated areas along the line of which the dike is to be constructed. It is also to be understood that there are tidal variations of the Mississippi River in the delta area. In FIG. 1 of the drawing, a trench is shown as having been excavated having a trench bottom 10, a water-side wall 11 of the trench and a back wall 12. The width of the trench 10 may vary depending upon the height of the dike to be constructed. Generally, the width of the bottom of the trench is 2 to 5 times the height of the dike to be constructed.

Depending upon the elevation at which the dike is to be constructed, the trench 10 is excavated down to between mean sea level and 5 feet below sea level. The sides 11 and 12 of the trench may be formed at various angles depending upon the strength of the earth formation. If desired, the sides of the trench may be allowed to form an angle caused naturally by the trenching operation. Alternatively, the side of the trench may be sloped during the construction to have a slope as little as one foot rise for each three foot run from the bottom of the trench. The trench 10 may be excavated by any suitable means well known to the industry as, for example, by a clam shell bucket mounted either on land or on a barge on the adjacent body of water. In certain situations and locations, the material removed from the trench 10 is piled outwardly and along the water side of the trench to form a temporary barrier 13 to hold back water from the trench. Alternatively, this barrier 13 could be formed prior to the trench excavation by transporting any suitable material, as by barge, to the location where the material is needed.

In certain areas, small anchor trenches 14 and 15 located on opposite sides of the trench 10 may be excavated. These anchor trenches extend the length of the trench 10 and may be used as sumps for pumping water from the trench to depress the water level and assist during the dike construction period. Additionally, the trenches 14 and 15 can be employed to anchor synthetic fabric to the bottom of the trench 10. Referring to FIG.

2 of the drawing, the trench 10 and at least the trench wall toward the water 11 is shown as being covered by a trench cover 16 in the form of a first woven synthetic permeable flexible fabric which will separate the dike building material from the trench subsoil 17 and inhibit the migration of fines into the subsoil. The trench cover 16 to be placed at the base of the dike is a woven fabric of long chain polymeric filaments or yarns such as polypropylene, polyethylene, polyester, polyamide, or poly vinylidene-chloride formed into a stable network such that the filaments or yarns retained their relative position to each other. At the same time, a fabric made of this material is very flexible and resists any tearing action in the event that the bottom of the dike shifts or settles. One such suitable synthetic woven fabric is known as Mirai 600 X (Registered Trademark) manufactured by the Celenese Corporation.

Another woven polypropylene fabric designed to meet requirements for soil separation, stabilization and reinforcement is known as TRI-LOCK CEF 300 which is manufactured by Tri-Lock, Inc. of Houston, Texas. By ASTM Standards this material has a tensile strength of 300×300 lbs., an elongation at break of 20%, tensile strength at 10% elongation of 150 lbs., burst strength of 600 psi with an equivalent opening size of the woven fabric of 70 U.S. standard sieve.

Figure 2:
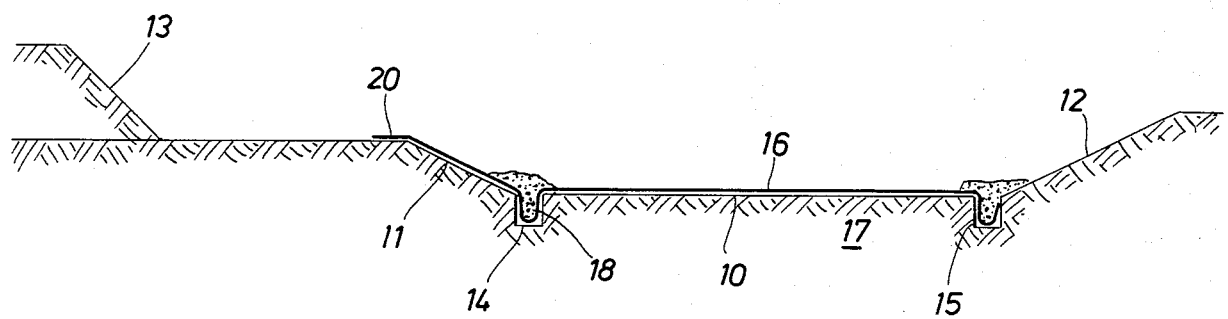

Strips of the synthetic fabric 16 are cut in lengths sufficient to stretch across the width of the bottom of the trench 10 and up the water side wall 11 thereof as shown in FIG. 2 of the drawing. In the event that anchor trenches 14 and 15 are used, longer strips of fabric are cut so as to extend into the anchor trenches 14 and 15, as shown. The fabric is anchored in the trenches 14 and 15 in any suitable manner, as by driving wooden stakes through the fabric into the ground or by filling the anchor trenches on top of the fabric with a shell material 18. By anchoring the fabric in the anchor trenches with shell, the anchor trenches can also be employed as sumps to pump water therefrom and reduce the level of the water in the trench and the soil forming the bottom of the trench.

In the event that anchor trenches are not employed, the strips of fabric are stretched across the bottom of the trench and up the water side wall thereof with the ends thereof being anchored in any suitable manner as by wooden stakes 20 driven into the ground. Strips of the trench cover fabric are laid side by side across the width of the trench throughout the length of the trench which may be up to a mile or more. The adjacent edges of two side by side strips of fabric preferably overlap, say, a foot or more, so that there is additional give to the fabric in a direction along the length of the trench so as to allow for irregular settling of certain areas of dike with time. Preferably the overlap of the fabric is at least 18 inches.

Dike construction material comprising specified volumes of sand, shell and cement are mixed together, preferably on an adjacent barge in the body of water, and then transferred to the trench 10 and spread out to form a layer of the material in the trench. Additional layers of the material are added until the dike has been built to the height desired. The separate layers of material, as they are added to the trench and added above the trench, are compacted in any suitable manner by equipment well known to the art as by bull dozers or the equivalent. An effort is made to avoid segregation of the sand, shell and cement components of the dike construction material as it is put in place.

The dike construction material is a relatively light weight material wherein each cubic yard of a shell, sand mixture comprises about 0.75 cubic yard of shell for each 0.25 cubic yard of sand. These amounts can be varied plus or minus 10%. To this mixture of shell and sand between 1.5 and 2.5 sacks of cement are added for each cubic yard of shell-sand mixture so as to form a substantially dry flowable shell-sand-cement mixture. The shell material to be used is preferably clam shell which is substantially unbroken and free of debris. That is, the foreign matter content of the shell should not exceed more than about 5% of the dry weight.

Any suitable sand binder material may be used although generally locally existing hydraulically-placed silty sand fill and/or the silty beach sands would probably be used. The grain distribution of one particular sand of this type showed 100% passed through a No. 40 sieve, 90 to 95% passed a No. 60 sieve, 50 to 70% passing a 100 sieve, and 10 to 15% passing through a No. 200 sieve The moisture content of the sand at the time of its mixing with the clam shell and at the time of placement in the dike is preferably within the range of 10 to 30%. Between 1½ and 2½ sacks of cement is admixed with each cubic yard shell-sand mixture.

Figure 3:
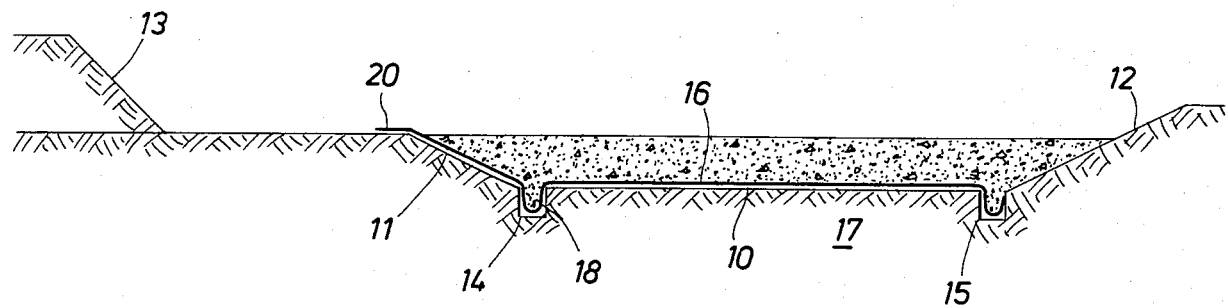
Figure 4:
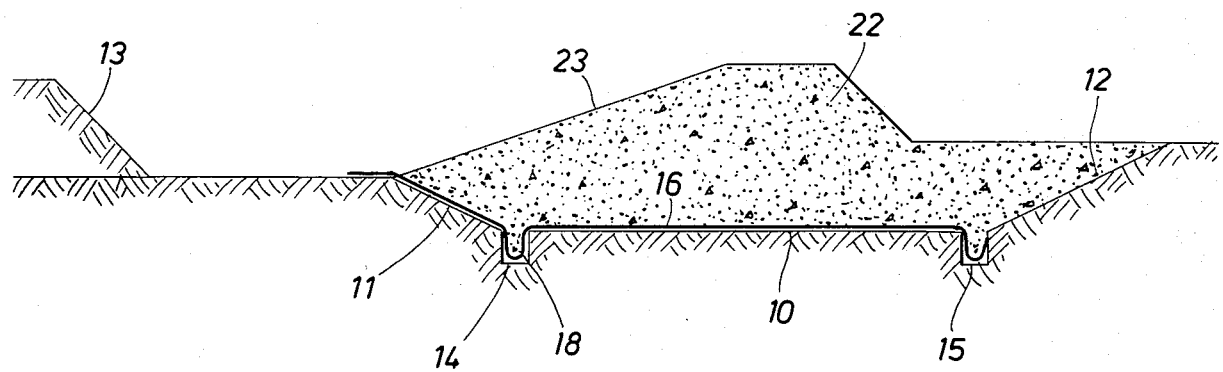

In FIG. 3, the trench 10 is shown as having been filled with a shell-sand-cement mixture for dike construction material up to the mean water level of the body of water. In FIG. 4, the completed dike 22 is shown as having been built to the desired elevation by adding additional layers of shell-sand-cement mixture on the top and compacting each layer before adding more. The front face 23 of the dike 22 is sloped at an angle during construction to meet the requirements for which the dike was built. The slope of the front face of the dike subject to wave and current action may vary from 1 to 1 to as much as 5 to 1. In FIG. 4, the front face 23 is shown as having a 3 to 1 slope.

Figure 5:
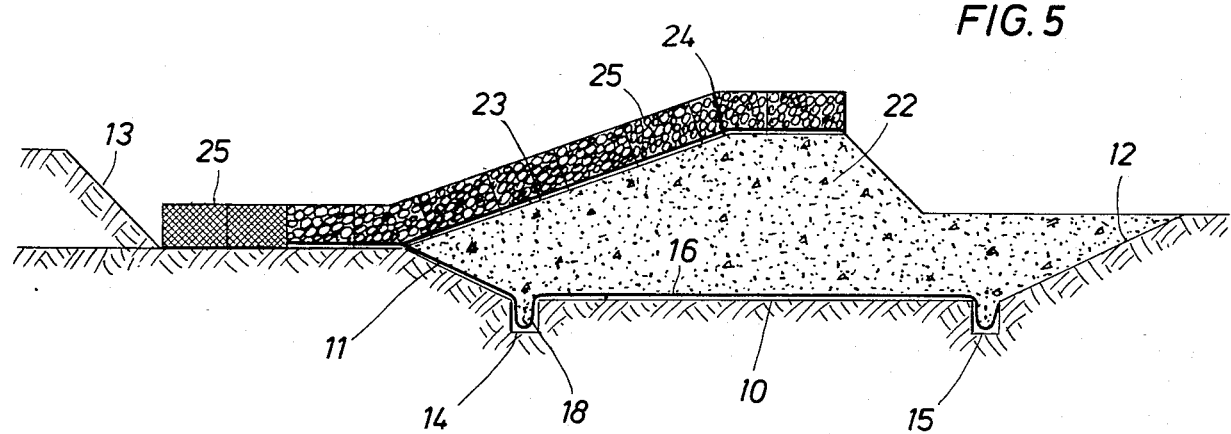

In order to prevent erosion of the fines from the shell-sand-cement material forming the dike, the entire dike is covered at least on the water-side slope of the dike and the crest of the dike with a second synthetic flexible fabric to form a dike cover that is permeable to water and impermeable to substantially all of the fine solid material used in the dike construction material. Again, strips of filter fabric are cut in lengths sufficient to extend from in front of the water side face of the dike, up the sloping front of the dike and across the crest. This dike cover 24 (FIG. 5) may be made of a synthetic woven or non-woven fabric material similar to the one described with regard to the trench cover 16. If a woven material is used, the opening in the fabric must be small enough to prevent loss of substantially any of the fines in the dike construction material. Preferably, sheets of synthetic non-woven fabric material are employed. These may consist of long chain synthetic polymers composed mainly of polypropylene, polyester, polyethylene, or polyamine and generally contain stabilizers and/or inhibitors added to the base plastic as necessary to make the filaments resistant to deteriation due to ultra violet or heat exposure. Composition of the fabric is preferably stable fiber or continuous filament and construction shell continuous filament. A suitable non-woven filter fabric sold under the trade name Fibretex is manufactured by Crown Zellerbach Company. Another such filter fabric is Trevira Spun bound type 1135 as manufactured by Hoechst Fibers Industries.

The dike cover is made by stretching a series of parallel strips of fabric forming the dike cover covering 24 in side-by-side arrangement with the adjacent edges being sewen together or bonded by cement and/or heat treatment. The dike cover 24 is held in place by a layer of rock-containing gabions which cover the crest of the dike, the water-front face of the dike and extend outwardly a distance of at least 3 feet from the dike toward the body of water. In some instances, the gabions are placed as a layer of rock for as much as 10 feet or more in front of the dike. Rock filled gabions placed on the river face, top, and in front of the dike toe reduces wave impact energy, minimize scour at the toe and prevent isolated localized failures.

Metal mesh gabions 25 are well known to the art and generally may consist of any arrangement of metal mesh containers from 2 to 30 feet long which are divided into a number of compartments having openings through which they are filled with rock. Preferably, the rock fill is of a hard and durable quality to assure permanence in the structure of the dike. Generally, the rock used is free of cracks, seams and other defects that would tend to increase unduly the deteriation from naturel causes or reduce the size of the rock so that it could not be retained in the gabion baskets. The rock used generally has a minimum specific gravity of about 2.5 and for use on dikes has a well graded mixture of sizes ranging from 3 to 8 inches in diameter based on U.S. Standard square mesh sieves. A suitable rock for use in gabions is igneous rock or clean, hard, crushed, linestone. After the fabric dike cover 24 has been stretched in place, the gabion basket units are placed on the fabric cover. Gabion units are assembled individually and placed on the dike surface. All ajoining empty gabion units are preferably connected together in any suitable manner, as by wire loops or lacing along the perimeter or between contact surfaces in order to obtain a monolithic structure. Alternatively, metal clips may be used in place of wire loops.

The wire mesh of the gabions may be coated in any suitable manner as by galvanizing or with a plastic coating such as polyvinyl-chloride or with both. Rock filling of the connected gabions is done either by hand or by machine so as not to damage the gabion basket wire coating and to assure a minimum of voids between stones. While maintaining the alignment of the gabions on the dike surface during the filling process. The layer of rock at the top of the gabion is leveled so as to assure proper closing of the gabion. In the event that lids are provided on top of the gabions, these lids are stretched over the stones so that their perimeter edges can be wire-laced to the edge of the fill opening. A typical gabion may be 30 feet long, 6 feet wide, and 18 inches high. A gabion of this size would be divided into, say, ten 3 foot×6 foot compartments that were 18 inches deep. Each compartment would have a fill opening formed at the top which would later be closed by wire mesh similar to that of the gabions. In some areas, such as the Mississippi delta area, gabions should be extended outwardly from the toe or bottom of the dike toward the body of water for a distance of at least 1½ times the wave height to be encountered.

Thus it may be seen but that by the method of the present invention a lightweight, semi-permeable, semi-flexible dike structure can be constructed on the relatively unstable land of a river delta. A dike built in accordance with the present invention weighs about 80 to 85 pounds per cubic foot as compared with 150 pounds per cubic foot for a cement reinforced dike or 165 pounds per cubic foot for rock alone. The lightweight structure of the present invention is a semi-flexible, semi-permeable mass of shell-sand-cement arranged between two fabric layers. Thus a portion of the dike can settle to a lower elevation without large cracks forming in it and without losing any of the material with which the dike was constructed. One preferred dike fabric cover is a 100% polyester continuous-spun needle-punched fabric resistant to freezing and thawing, soil chemicals and ultra violet light exposure. The needle holes punched in the fabric allow water to enter without permitting any of the fines of the materials within the dike to escape into the surrounding body of water.

Figure 6:
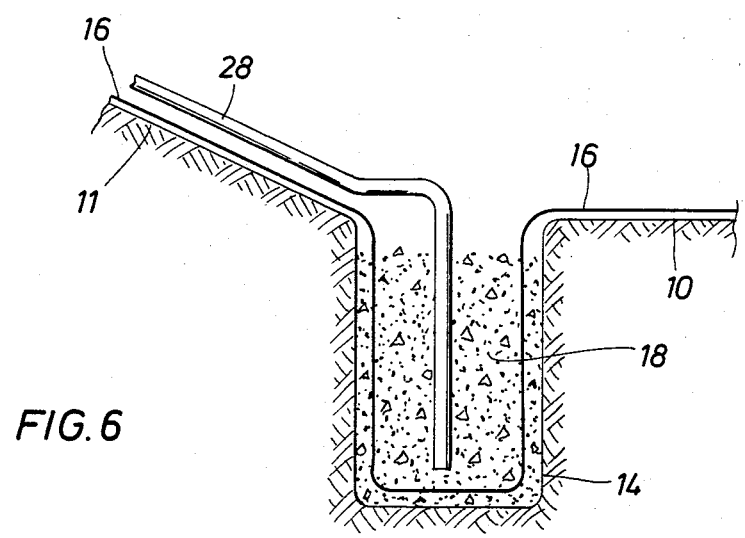
FIG. 6 is a diagrammatic cross-sectional view of a drain trench formed in the bottom of the dike trench.

In FIG. 6, a detail of an anchor trench 14 is shown which is arranged to act as a sump. The fabric trench cover 16 which is stretched over the bottom of the trench 10 dips down into and up out of the anchor trench 14 and then extends up the front face 11 of the trench.

A suction line 28 is positioned in the trench 14 and the open lower end of the suction line extends downwardly to a point just above the fabric 16. The trench is then filled with clam shell material which serves to anchor the trench cover 16 in the anchor trench and also provide easy drainage of water along the trench. The other end of the suction pipe 28 is operatively connected to a suitable manifold and suction pump (not shown) whereby water in the trench above the draw-off point is removed from the trench. The suction line 28 may be later removed when the dike is constructed.

I claim as my invention:

1. A method of installing an erosion-preventing lightweight, semi-permeable, semi-flexible structure in the form of a dike for erosion control of a bank along a body of water, excavating a trench on the land forming a bank along a body of water, covering the trench and at least the trench wall toward the water with a first woven synthetic permeable flexible fabric to form a trench cover to separate dike building material from the trench subsoil and to inhibit the migration of fines into the underlying soils, mixing shells, sand and cement together to form the necessary volume of dike construction material, spreading a series of shallow layers of said shell-sand-cement mixture of dike material in the trench, compacting the shell-sand-cement mixture between layers above the water level prior to adding another layer, repeating the steps of adding and compacting additional layers of dike material until the crest elevation and at least the selected water-side slope of the dike has been attained, covering the crest and the water-side slope of the dike with a second synthetic flexible fabric to form a dike cover permeable to water and impermeable to substantially all of the fine solid material in the shell-sand-cement mixture, and anchoring to at least the top and water-side slope of the dike said second synthetic flexible fabric dike cover.

2. The method of claim 1 wherein the step of anchoring the second synthetic fabric cover to the dike includes covering the fabric cover with a layer of rock.

3. The method of claim 1 wherein the step of anchoring the second synthetic fabric cover includes weighting the fabric cover with a layer of rock-filled gabions on at least the top and water-side slope of the dike.

4. The method of claim 3 including positioning at least a row of rock-filled gabions at the base of and in front of the dike on the water side.

5. The method of claim 1 wherein the trench being excavated has a width of from between 2 and 5 times the height of the dike being constructed.

6. The method of claim 1 including the step of removing the material from the trench during the excavating step and piling it on the water side and away from the trench to form a temporary breakwater in the water along the length of the trench.

7. The method of claim 1 wherein covering the trench and trench wall with said first woven synthetic permeable flexible fabric includes the steps of
cutting strips of the fabric in lengths sufficient to cover the width of the trench and the trench wall,
placing each strip across the trench and up the wall,
repeating the operation with successive strips of fabric to cover the entire length of the trench, and
overlapping the edges of adjacent strips of fabric throughout their length when they are in a side-by-side manner.

8. The method of claim 7 including the step of extending said first fabric out of said trench on the water-side thereof to cover a strip of earth along the water side of said trench and anchoring the leading edge of the fabric to the ground on the water side of and outside said trench.

9. The method of claim 1 including the steps of
forming a pair of shallow anchor trenches in the bottom of the excavated trench, said anchor trenches being spaced apart and being formed on opposite sides of the excavated trench substantially at the side walls thereof
extending said trench cover fabric into said anchor trenches and out of the anchor trench on the water side and up the slope of the side of the trench on the water side, and
anchoring said trench cover fabric in said shallow anchor trenches prior to building the dike in the trench.

10. The method of claim 1 wherein the step of mixing shells, sand and cement together to form a dike construction mixture comprises the steps of
mixing a cubic yard of shell and sand comprising 0.75 cubic yard plus or minus 10% of shell with 0.25 cubic yard minus or plus 10% sand, and
admixing 1.5 to 2.5 sacks of cement with each cubic yard of shell-sand mixture to form a substantially dry flowable shell-sand-cement mixture.

11. The method of claim 1 including the step of excavating the trench to a depth of from mean water level to about five feet below mean water level.

12. The method of claim 3 including the step of connecting the gabions to any adjacent gabions to form a layer of rock anchored against movement in metallic mesh containers.

13. The method of claim 1 wherein covering the crest and water-side slope of the dike comprises the steps of
cutting strips of the second fabric in lengths sufficient to extend up the water-side slope and across the crest of the dike,
placing the strips on and across the dike in side-by-side arrangement,
repeating the operation with successive strips of fabric to cover the entire length of compacted material forming the dike, and
connecting the adjacent edges of the strips together.

14. The method of claim 1 wherein the anchoring operation comprises the steps of
covering at least the top and water-side slope of the dike with open-topped gabions of metal mesh arranged in side-by-side relationship,
connecting all of the gabions together at abutting surfaces to form a unitary gabion structure covering the fabric dike cover,
filling the gabions with rock of a size larger than the mesh of the gabions, and
closing the tops of the gabions with metal mesh.

* * * * *